US010213693B2

(12) United States Patent
Lindquist et al.

(10) Patent No.: US 10,213,693 B2
(45) Date of Patent: Feb. 26, 2019

(54) METHOD AND APPARATUS FOR AWARDING TROPHIES

(71) Applicant: Sony Interactive Entertainment LLC, San Mateo, CA (US)

(72) Inventors: Timothy Lindquist, San Carlos, CA (US); George Weising, Culver City, CA (US); Geoffrey Piers Robert Norton, Foster, CA (US); Jacob P. Stine, La Honda, CA (US); Dmitri Tolstov, San Carlos, CA (US); Takayuki Kazama, Belmont, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 102 days.

(21) Appl. No.: 15/366,776

(22) Filed: Dec. 1, 2016

(65) Prior Publication Data

US 2017/0157517 A1 Jun. 8, 2017

Related U.S. Application Data

(60) Provisional application No. 62/263,538, filed on Dec. 4, 2015.

(51) Int. Cl.
*A63F 13/69* (2014.01)
*A63F 13/95* (2014.01)
(Continued)

(52) U.S. Cl.
CPC ............ *A63F 13/69* (2014.09); *A63F 13/798* (2014.09); *A63F 13/95* (2014.09); *G06F 17/30312* (2013.01)

(58) Field of Classification Search
None
See application file for complete search history.

(56) References Cited

U.S. PATENT DOCUMENTS

| 4,053,740 | A | * | 10/1977 | Rosenthal | ............... A63F 13/00 345/443 |
| 5,273,294 | A | * | 12/1993 | Amanai | .................. A63F 13/10 273/148 B |

(Continued)

FOREIGN PATENT DOCUMENTS

WO 2013043710 A1 3/2013

OTHER PUBLICATIONS

International Search Report and Written Opinion for International Application No. PCT/US2016/064455, dated Feb. 16, 2017.

(Continued)

*Primary Examiner* — Tramar Harper
(74) *Attorney, Agent, or Firm* — JDI Patent; Joshua Isenberg; Robert Pullman

(57) ABSTRACT

A computer-implemented method assigns one or more trophies to a user. A game is emulated in response to a request from a client device. A trophy trigger is detected during emulation of the game by comparing a current program counter value to a predetermined value and comparing a stored instruction in an instruction storage location to a predetermined instruction when the current program counter value matches the predetermined counter value. The one or more trophies are assigned to a user account that is associated with the user when the current program counter value matches the predetermined value and the instruction in the instruction storage location matches the predetermined instruction.

21 Claims, 6 Drawing Sheets

(51) Int. Cl.
  *G06F 17/30*  (2006.01)
  *A63F 13/798* (2014.01)

(56) References Cited

U.S. PATENT DOCUMENTS

| | | | |
|---|---|---|---|
| 5,890,964 A * | 4/1999 | Aoki | A63F 13/10 |
| | | | 463/44 |
| 6,167,358 A * | 12/2000 | Othmer | G06F 11/0748 |
| | | | 702/188 |
| 8,484,219 B2 | 7/2013 | Weising | |
| 8,504,487 B2 | 8/2013 | Weising | |
| 8,537,113 B2 | 9/2013 | Weising et al. | |
| 8,717,294 B2 | 5/2014 | Weising et al. | |
| 8,725,659 B2 | 5/2014 | Weising | |
| 8,730,156 B2 | 5/2014 | Weising et al. | |
| 8,954,356 B2 | 2/2015 | Weising | |
| 9,310,883 B2 | 4/2016 | Weising et al. | |
| 9,372,701 B2 | 6/2016 | Weising | |
| 9,513,700 B2 | 12/2016 | Weising et al. | |
| 9,557,814 B2 | 1/2017 | Weising | |
| 2007/0077997 A1 | 4/2007 | Johnson | |
| 2011/0216002 A1 | 9/2011 | Weising et al. | |
| 2011/0216060 A1 | 9/2011 | Weising et al. | |
| 2011/0242134 A1 | 10/2011 | Miller et al. | |
| 2011/0260830 A1 | 10/2011 | Weising | |
| 2013/0073551 A1 * | 3/2013 | Suba-Miura | G06F 17/30 |
| | | | 707/736 |
| 2013/0123006 A1 * | 5/2013 | Kelly | G07F 17/3267 |
| | | | 463/29 |
| 2013/0252741 A1 * | 9/2013 | Ikenaga | A63F 13/12 |
| | | | 463/42 |
| 2014/0002359 A1 | 1/2014 | Weising et al. | |
| 2014/0040168 A1 | 2/2014 | Weising | |
| 2014/0066177 A1 | 3/2014 | Zalewski | |
| 2014/0232652 A1 | 8/2014 | Weising et al. | |
| 2014/0235311 A1 | 8/2014 | Weising et al. | |
| 2014/0235358 A1 * | 8/2014 | Wang | A63F 13/355 |
| | | | 463/43 |
| 2016/0214011 A1 | 7/2016 | Weising et al. | |

OTHER PUBLICATIONS

Co-Pending U.S. Appl. No. 62/263,538, to Timothy Lindquist, filed Dec. 4, 2015.

* cited by examiner

METHOD AND APPARATUS FOR AWARDING TROPHIES

CLAIM OF PRIORITY

This application is a Non-Provisional application that claims the priority benefit of U.S. Provisional Patent Application No. 62/263,538, filed Dec. 4, 2015, the entire disclosures of which are incorporated herein by reference.

FIELD OF THE INVENTION

This disclosure relates generally to a system and method of awarding trophies in previously released or sold video games, without modifying the original game. More specifically, the present invention relates to defining, detecting and awarding a set of trophies for the players of the previously released games.

BACKGROUND OF THE INVENTION

Generally, trophies are an important part of modern gaming. However, often, older games do not have the capability to award trophies to player. In order to enhance the gaming experience, it would be desirable to be able to award trophies to users playing older games that were not introduced with the trophy feature.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

SUMMARY OF THE INVENTION

Figure 1:
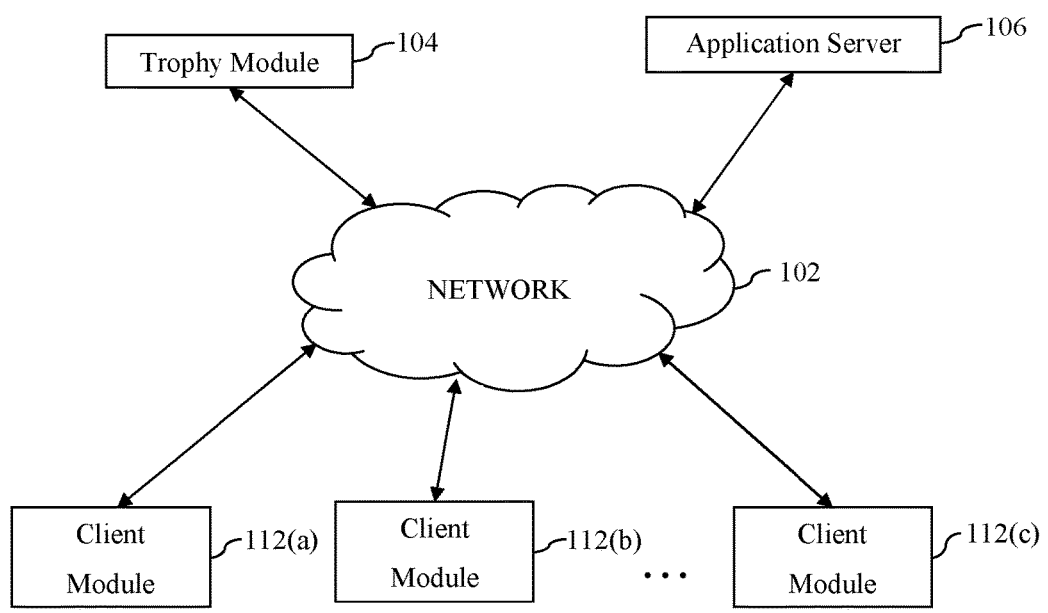
FIG. 1 illustrates an example of a network that supports aspects of the present disclosure.

The disadvantages associated with the prior art are overcome by aspects of the present disclosure relating to

DESCRIPTION OF THE SPECIFIC EMBODIMENTS

It is noted that in this disclosure and particularly in the claims and/or paragraphs, terms such as "comprises", "comprised", "comprising", and the like can have the meaning attributed to it in U.S. patent law; that is, they can mean "includes", "included", "including", "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Aspects of the present disclosure may be implemented using one or more processing devices, or processing modules. The processing devices, or modules, may be coupled such that portions of the processing and/or data manipulation may be performed at one or more processing devices and shared or transmitted among a plurality of processing devices.

Indeed, aspects of the present disclosure may be implemented in a distributed or "cloud" computing environment in which shared resources, software and information are provided to computers and other devices over a network, which may be, for example, the Internet. "Cloud computing" typically involves delivering hosted services over the Internet. A cloud service typically has three distinct characteristics that differentiate it from traditional hosting. One characteristic is that it is sold on demand, typically by the minute or the hour; secondly, it is elastic—a user can have as much or as little of a service as they want at any given time; and thirdly, the service is usually fully managed by the provider (the consumer needs nothing but a personal computer and Internet access). Significant innovations in virtualization and distributed computing, as well as improved access to high-speed Internet have accelerated use of cloud computing. The cloud can be private or public. A public cloud typically sells services to anyone on the Internet. (Currently, Amazon Web Services™ is the largest public cloud provider.) A private cloud is a proprietary network or a data center that supplies hosted services to a limited number of people. When a service provider uses public cloud resources to create their private cloud, the result is called a virtual private cloud. Private or public, the goal of cloud computing is to provide easy, scalable access to computing.

"Distributed computing", or "distributed systems" relate to a system of multiple autonomous computers or processing devices or facilities that communicate through a network. The computers interact with each other in order to achieve a particular goal. A computer program that runs in a distributed system is typically referred to as a "distributed program" and "distributed programming" is the process of writing such programs. Distributed computing also refers to the use of distributed systems to solve computational problems. Typically, in distributed computing, a problem is divided into multiple tasks, each of which is solved by one or more computers.

In general, distributed computing is any computing that involves multiple computers remote from each other that each has a role in a computation problem or information processing. The computers can share memory and/or processing capability and/or functionality.

According to aspects of the present disclosure, awarding of trophies may be reliably triggered during game emulation by looking at the program counter of the game being emulated to determine whether the program counter value corresponds to a predetermined trophy event and to confirm that a corresponding instruction expected to be in memory or certain registers is present. The program identifies the memory and/or register location of the corresponding instruction. Depending on the processor architecture, the program counter points to instruction that is currently executing or the next instruction to be executed. Additional levels of validation checks may be used to ensure that trophies are not awarded unless they are validly earned.

FIG. 1 shows a network environment that supports awarding trophies in accordance with aspects of the present disclosure. As shown in FIG. 1, the system includes a communication network 102, a trophy module 104, an application server 106, and a plurality of client modules 112(a), 112(b) . . . 112(n) (where "n" is any suitable number).

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio naves that can be picked up by Wi-Fi receivers that are attached to different computers.

The trophy module, or facility, or unit, 104 is typically one or more processors with associated memory, such as computers, or other processing devices such as a server, desktop computer or any processing module with adequate storage and processing functionality.

Specifically, trophy module 104 may be utilized in a cloud computing or distributed computing environment.

The application server module, or facility, or unit, 106 is typically one or more processors with associated memory, such as server computers, general computers, or other processing devices such as a desktop computer, laptop computer, and the like. It is noted that the application server 106 may be a single server, and also may be implemented as one or more separate servers. Specifically, application server 106 may be utilized in a cloud computing or distributed computing environment.

Client modules 112(a) . . . (n) (generally referred to as 112, herein) typically include devices with processing capabilities and memory and an output displays, such as, laptop computers, desktop computers, cell phone, personal digital assistant (PDA), wireless handheld device, PLAYSTATION™, PSP™ and the like. The client modules 112 may be capable of processing and storing and displaying data themselves or merely capable of accessing processed and stored data from another location (i.e., both thin and fat terminals) and displaying the accessed or retrieved data. It is also an embodiment of the present invention that the functionality of server 106 could also be part of server 106 and/or client device, or terminal 112.

The trophy module 104, the application server 106 and the client modules 112(a), 112(b) . . . 112(n) are coupled to network 102 via an associated bi-directional communication medium, which may be for example a serial bus such as IEEE 1394, or other wire or wireless transmission medium.

Figure 2:
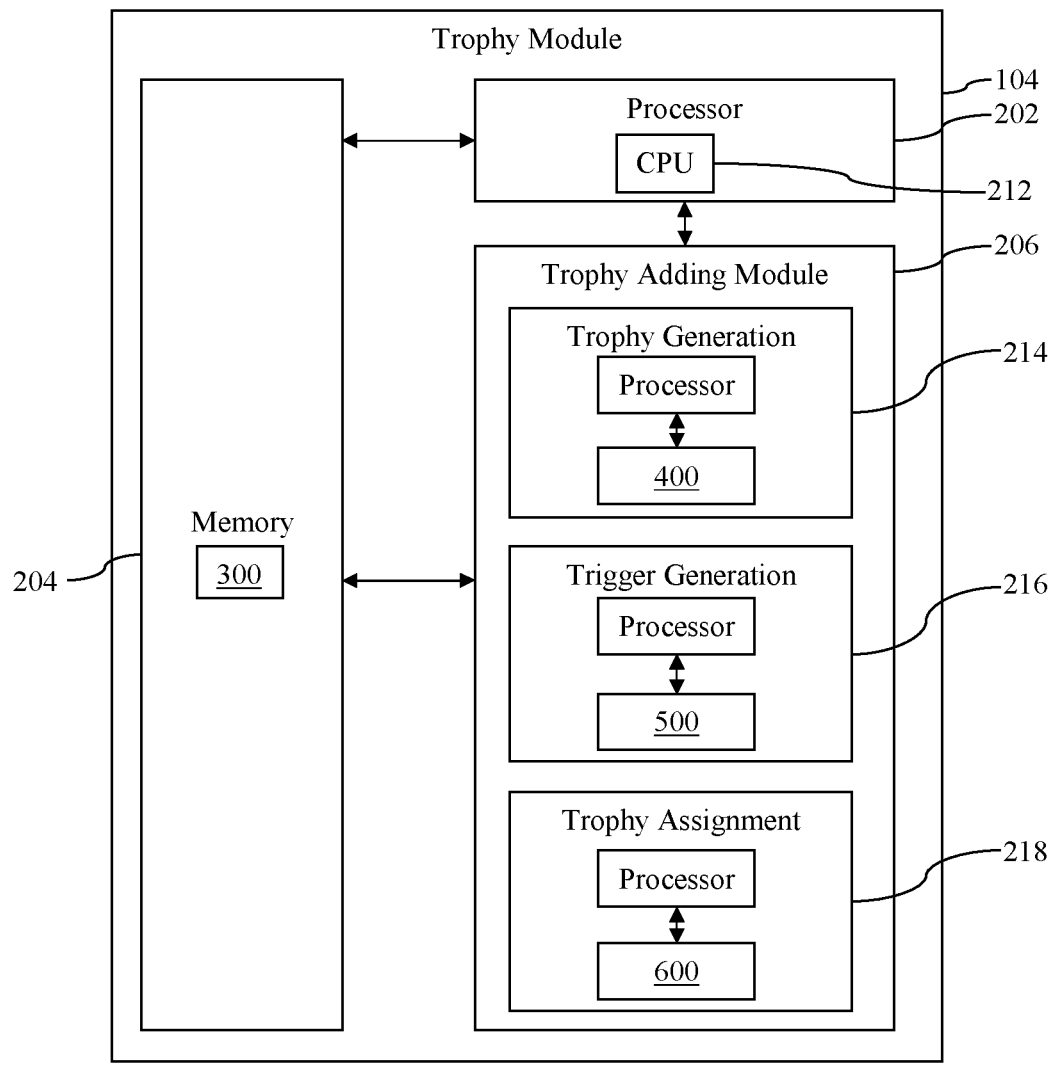
FIG. 2 shows an example of trophy module according to an aspect of the present disclosure.

FIG. 2 illustrates an example of a trophy module 104 according to an embodiment of the present invention. A trophy module 104 includes a processor module 202, a memory module 204 and a trophy adding module 206. The trophy module 104 may be a module, "plug-in" unit, stand-alone unit or other facility that resides on another module or device. For example, trophy module may be a component of or executed by client module(s) 112 and/or server 106, as described herein. The trophy module 104 may be operatively coupled to a system, such as components 112, 102 and 106 of FIG. 1, so that the functionality of trophy module 104 may be utilized with those components. Thus, the trophy module 104 may be retro-fitted to be accessed with older, previously released games that were not released or sold with this functionality.

Processor module 202 is coupled to the trophy adding module 206 via an associated communication link to enable processor module 202 and memory 204 to coordinate processing operations of the modules shown in FIG. 2. The processor module 202 includes a CPU 212, which is typically a processor that includes an arithmetic logic unit (ALU) (not shown), which performs arithmetic and logical operations, and a control unit (CU) (not shown), which extracts instructions from memory and decodes and executes them, utilizing the ALU when necessary. An I/O interface may be used to operatively couple the components of processor module 202.

Memory module 204 stores programs, which include, for example, a web browser, algorithms, as well as typical operating system programs (not shown), input/output (I/O) programs (not shown), BIOS programs (not shown) and other programs that facilitate operation of trophy module 104. The web browser (not shown) is for example an Internet browser program such as Internet Explorer™. Memory module 204 may be, for example, an electronic storage medium, such as an electronic storage repository that can store data used by trophy module 104. The memory module 204 may include, for example, RAM, ROM, EEPROM or other memory media, such as an optical disk, optical tape, CD, or a floppy disk, a hard disk, or a removable cartridge, or transitory or non-transitory electronic storage medium, on which digital information is stored in the form of bits. The memory module 204 may also be remote memory coupled to processing module 202 via wired or wireless bi-directional communication medium.

Trophy adding module 206 includes all the trophy adding functionality of various levels. For example, trophy adding module 206 includes trophy generation module 214, trigger generation module 216, and trophy assignment module 218.

Trophy generation module 214 is used to define and generate a set of trophies. The defined and generated trophies may be stored in the memory, or other memory location. One example of such a memory is shown as memory module 400 in trophy generation module 214. Alternatively, the memory location may be remote from the trophy module 104.

Trigger generation module 216 is used to define and generate in-game triggers. The defined and generated triggers may also be stored in the memory, or other memory location. One example of such a memory is shown as memory module 500 in trigger generation module 216. Alternatively, the memory location may be remote from the trophy module 104.

Trigger assignment module 218 is used to detect the in-game trigger while the game is being played by a user, award the trophies, and keep track of the trophies that the user has triggered. The trophy assignment module 218 assigns each trophy for a game based on different triggers. The trophy module 104 and trophy assignment module 218 may also be configured to award the same trophy for achievements in two or more different games. Triggers for different trophies may be stored in a memory. One example of such a memory is shown as memory module 600 in trophy assignment module 218. Alternatively, the memory location may be remote from the trophy module 104.

Figure 3:
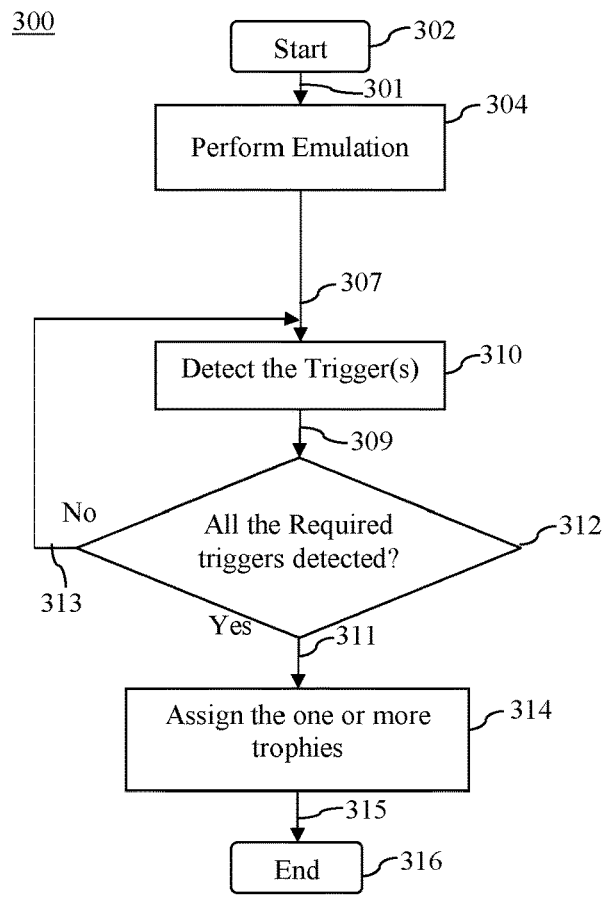
FIG. 3 shows an example of a series of steps of adding trophies to an existing game according to an aspect of the present disclosure.

FIG. 3 shows an example of a series of steps of adding trophies to an existing game according to an embodiment of the present invention. The series of steps 300 may be stored on a non-transitory computer readable medium or media (e.g., RAM, ROM, EEPRPOM, DRAM or other memory, electronic storage device or registry) and may be executed by a processor or plurality of processors. The steps 300 may be computer code or other program code (e.g., source code) that may be compiled into object code. The code, stored on a medium and/or accessed, is a module, which may include electronic storage and/or processing functionality.

Generally, FIG. 3 shows, program code, or steps 300 of a trophy adding process that: defines a set of trophies and the in-game triggers; detects the in-game triggers while the game is being played by a user; and awards the trophies and keeps track of the trophies that the user has triggered. This computer code, or algorithm, may be stored in memory module 300 of memory 204 shown in FIG. 2.

Specifically, FIG. 3 shows that program code 300 begins with start step 302. Line 301 shows that in step 304 a game is emulated, e.g., by an application server 106, in response to a request from a client device. Emulation has commonly been achieved with software that converts program instructions designed for a target platform being emulated (target code instructions) into the native-language of a host platform that performs the emulation (host instructions). Emulation has also been realized through use of "virtual machines," in which the target platform's physical architecture—the design of the hardware itself—is replicated via a virtual model in software.

Two main types of emulation strategies commonly used for emulation. The first strategy is known as "interpretation", in which each target code instruction is decoded in turn as it is addressed, causing a small sequence of host instructions then to be executed that are semantically equivalent to the target code instruction. The main component of such an emulator is typically a software interpreter that converts each instruction of any program in the target machine language into a set of instructions in the host machine language, where the host machine language is the code language of the host computer on which the emulator is being used. In some instances, interpreters have been implemented in computer hardware or firmware, thereby enabling relatively fast execution of the emulated programs. The second common emulation strategy is known as "translation", in which the target instructions are analyzed and decoded. This is also referred to as "recompilation" or "cross-compilation".

In emulation the host system has access to a program counter of the target system. The program counter (PC), also commonly called the instruction pointer (IP) in Intel x86 and Itanium microprocessors, and sometimes called the instruction address register (IAR), the instruction counter, or just part of the instruction sequencer, is a processor register that indicates where a computer is in its program sequence. Most processors increment the program counter after fetching an instruction, and is said to "point to" the next instruction. The program counter may point to the next instruction by holding a memory address or register location that contains the next instruction that would be executed. In a processor where the PC is incremented before the instruction fetch, the PC points to the current instruction being executed.

Instructions are usually fetched sequentially from memory, but control transfer instructions change the sequence by placing a new value in the PC. These include branches (sometimes called jumps), subroutine calls, and returns. A transfer that is conditional on the truth of some assertion lets the computer follow a different sequence under different conditions. A branch provides that the next instruction is fetched from somewhere else in memory. A subroutine call not only branches but saves the preceding contents of the PC somewhere. A return retrieves the saved contents of the PC and places it back in the PC, resuming sequential execution with the instruction following the subroutine call.

In a typical central processing unit (CPU), the PC is a digital counter (which is the origin of the term "program counter") that may be one of many registers in the CPU hardware. The instruction cycle begins with a fetch, in which the CPU places the value of the PC on the address bus to send it to the memory. The memory responds by sending the contents of that memory location on the data bus. (This is the stored-program computer model, in which executable instructions are stored alongside ordinary data in memory, and handled identically by it). Following the fetch, the CPU proceeds to execution, taking some action based on the memory contents that it obtained. At some point in this cycle, the PC will be modified so that the next instruction executed is a different one (typically, incremented so that the next instruction is the one starting at the memory address immediately following the last memory location of the current instruction).

Like other processor registers, the PC may be a bank of binary latches, each one representing one bit of the value of the PC. The number of bits (the width of the PC) relates to the processor architecture. For instance, a "32-bit" CPU may use 32 bits to be able to address $2^{32}$ units of memory. If the PC is a binary counter, it may increment when a pulse is applied to its COUNT UP input, or the CPU may compute some other value and load it into the PC by a pulse to its LOAD input. To identify the current instruction, the PC may be combined with other registers that identify a segment or page. This approach permits a PC with fewer bits by assuming that most memory units of interest are within the current vicinity.

According to aspects of the present disclosure trophy trigger may be detected during emulation of a game by comparing the current program counter value and corresponding stored instruction to predetermined counter and instruction values that correspond to a trophy event. One or more trophies may be assigned to a user account associated with a user when the current program counter value matches the predetermined counter value and the instruction in the instruction storage location matches the predetermined instruction value. By way of example, and not by way of limitation, the predetermined program counter value and corresponding instruction may refer to a subroutine that corresponds to an event in a game for which a trophy is to be awarded. Examples of such events include, but are not limited to completing a level, defeating an enemy, finding an object, accomplishing a goal, or completing a mission. Certain trophy events may have additional conditions placed on them, e.g., completing a level without losing a life. The subroutine may be, e.g., initiation of an animation sequence, audio sequence, text display, change of level value, etc. that is uniquely associated with the event for which the trophy is being awarded. Code containing instructions that trigger such subroutines may include symbols that are predefined by game developers. Such symbols describe what corresponding portions of the code do when executed. In such implementations game developers may provide all symbols for the game in a library, which may be stored in the memory 600 of the trophy assignment module 218. In addition, during testing of the trophy module 104, execution of the game code may be frozen to examine instructions in snapshots to test the code for triggering trophies.

Figure 4:
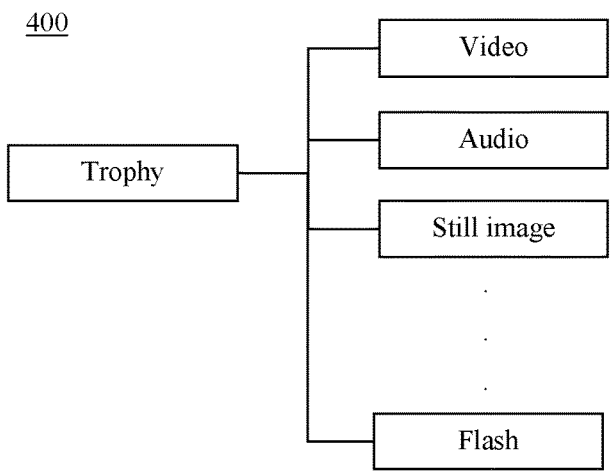
FIG. 4 illustrates an example of trophy according to an aspect of the present disclosure.

Trophies for the game may be predefined. The defined trophies could include data in a plurality of formats, as shown in FIG. 4 which is described below. The set of trophies could be a set of only one trophy or multiple trophies. Also, the defined trophies could include electronic trophies as well as physical objects, or a combination of electronic trophies and physical objects. Electronic trophies include, for example, electronic icons, additional digital data, such as video footage, audio data (songs, melodies, etc.), photographic information, digital game accessories, tokens and other electronic representations. The physical objects may include physical trophy, physical game accessories, awards, ribbons and other physical objects that represent achievement or accomplishment.

FIG. 4 illustrates an example 400 of trophies according to an embodiment of the present invention. The defined trophies could be electronic trophies, such as video, audio, still image, flash file, and so on. For example, a specific video may be played when a particular game level is completed. In addition to the videos, there may be specific sounds, music, or speech that is played as a set of trophies of the game. The physical trophies have been described above.

Referring back to FIG. 3, in addition to predefined trophies a trigger or a sequence of triggers may also be pre-defined. These triggers may include the aforementioned program counter and corresponding instruction values and may include one or more other triggers as additional trophy validation checks.

Line 307 shows that in step 310 a defined trophy trigger is detected by comparing the current program counter value and corresponding stored instruction to predetermined counter and instruction values that correspond to a trophy event. The trophy assignment module 218 may validly assign a trophy when both program counter value and the corresponding instruction value match the relevant predetermined values associated with the trophy. One or more additional validity checks may optionally be performed as part of the trophy trigger detection at step 310.

Figure 7:
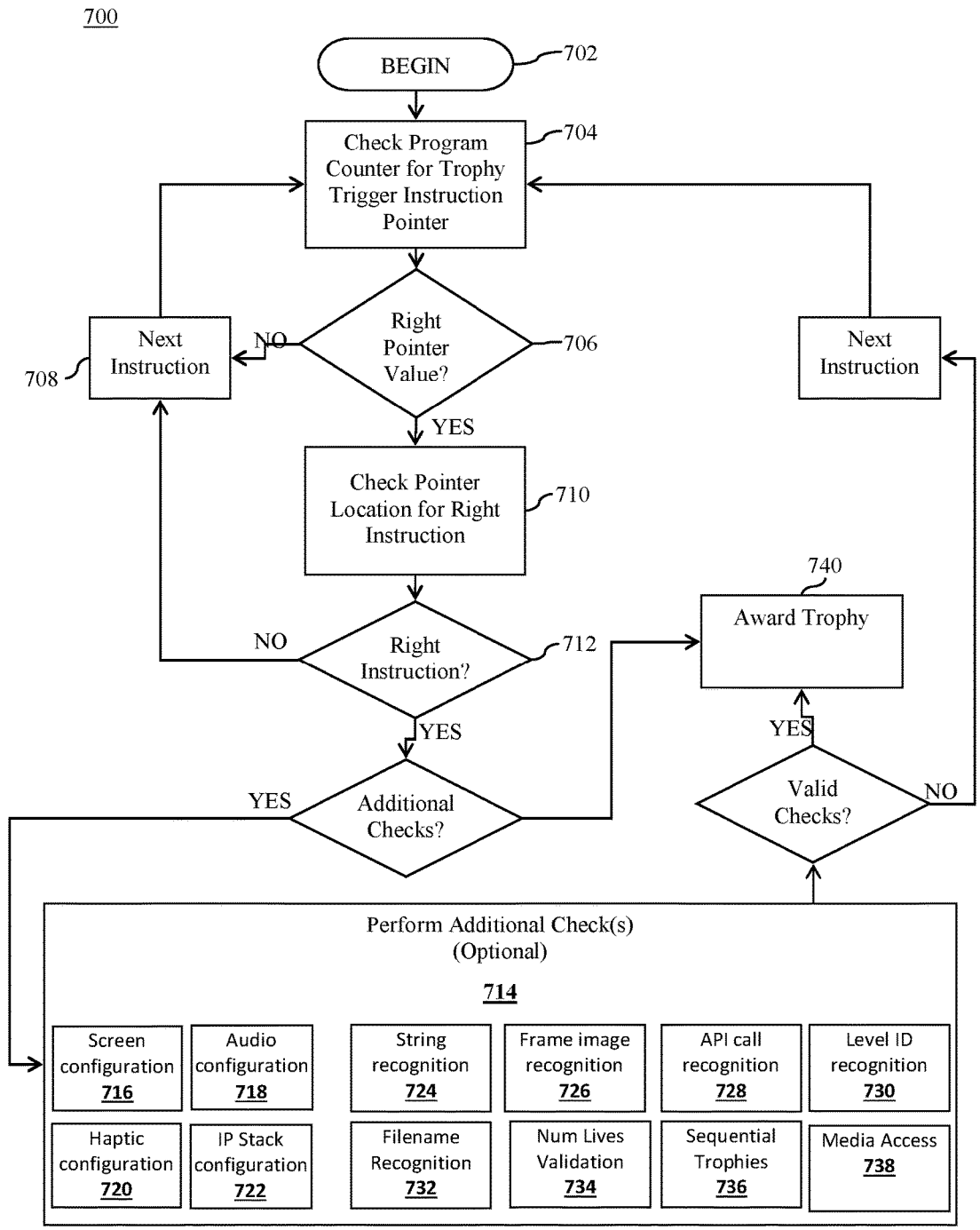
FIG. 7 shows a series of steps defining program counter analysis for detecting a trophy trigger according to an aspect of the present disclosure.

Details of the detection of a defined trigger using program counter analysis are shown in FIG. 7. Specifically, FIG. 7 shows a program code 700 begins with a start step 702. At step 704, the program counter value is checked for a predetermined trophy trigger instruction pointer. If, at step 706 the program counter value does not match the predetermined value the program 700 proceeds to the next instruction, as indicated at step 708. If, at step 706 the program counter value does match the predetermined value the program 700 proceeds to step 710 where it checks for the right predetermined instruction value in the location that the program counter points to. If at step 712 the program determines that the predetermined instruction is not in the location pointed to by the program counter, the program 700 proceeds to the next instruction, at step 708.

If at step 712 the program 700 determines that the predetermined instruction is in the location pointed to by the program counter, the program 700 may proceed to award the trophy, as indicated at 740. In some implementations, the program 700 may perform additional validity checks at step 714 before proceeding to award a trophy or trophies.

There are a number of different types of additional validity checks 714 that may be performed. For example, a particular screen configuration 716, audio configuration 718, haptic configuration 720, or IP Stack configuration 722 contemporaneous with the detection of the predetermined program counter and instruction values may be compared against corresponding predetermined screen, audio, haptic, or IP Stack configurations, respectively.

By way of example, and not by way of limitation, the screen configuration 716 may be compared using screen scraping of visual information that is to be displayed on a display device of a client module may be used as an additional validity check. As an example, screen scraping may be performed by using optical character recognition software to read a score and the time to be displayed. It is not always beneficial to continuously screen scrape the visual display, due to the burden on the processing power and the bandwidth of the network 102. Therefore, it is desirable to know when and where to perform the screen scraping. By way of example and not by way of limitation, the score may need to be above a predetermined level in order to trigger the trophy assignment module 218 to award a trophy to the user. If the trophy assignment module 218 only knows where the data for the score is stored, and not how that data correlates to the actual score displayed on the screen then the screen scrape may be initiated. A change in the data where the score is stored in the memory may be used as a trigger that initiates a screen scrape of the area of the screen where the score is displayed. Therefore, the actual value of the score is only found when there is a change in the score. Therefore, when the score changes, a screen scrape may be triggered, and if the screen scrape determines that the score is above 10,000 points, then this is used as an additional validity check to trigger to award a trophy.

Additional validity checks may also include recognition of a particular string 724, recognition of a particular frame image 726, or recognition of a particular application programming interface (API) call 728. As an example of string recognition 724, the trophy assignment module 218 could also detect specific strings that the game displays (e.g., "YOU WON") as additional validity checks for trophy generation. In some implementations the game may include a library for displaying strings. Semi-automated tools may be used to analyze the strings that are displayed. The trophy assignment module 218 can trap strings there to validate triggering the trophy. It is desirable to configure the string recognition 724 to avoid false positives. For example, a screen displaying "work your way up to 1000 gold" may inadvertently trigger trophy for winning 1000 gold. This can be avoided with an additional validity check of the memory value that corresponds to the amount of gold won by the user.

As a non-limiting example of frame image recognition 726, the trophy assignment module 218 could store a captured screen shot of a point in the game where the trophy is to be triggered and compare a current video frame to the captured screen shot using image recognition as an additional validity check to trigger trophy generation using frame image recognition 726. Semi-automated tools may be used to analyze the current video frame. For example, the image of the captured screen shot (or a relevant portion thereof) may be hashed and compared to a hash of the image (or relevant portion) of the current frame. A threshold may be set on the hash comparison to allow for slight differences between the two images. The trophy assignment module 218 could also monitor other events occurring in the game to limit the window of frames to analyze for this type of additional validity check.

To appreciate the usefulness of additional validity checks consider that not all games conditions for beating a level are implemented the same way. One possible additional validity check may use the fact that games assign a unique ID to each level. In such a case, the trophy assignment module 218 can look for change in level ID as an additional validity check, as indicated at 730. Furthermore, almost all games have lives. Beating a level without dying may entitle a user to another type of trophy. In such cases, the trophy assignment module 218 may validate the number of lives accordingly, as indicated at 732. To track the number of lives, the trophy assignment module 218 may implement a counter on Vsync, which the rate of presentation of a new frame. With each new frame, the trophy assignment module may check for a change in contents of a known location in memory that contains the number of lives and catch change in number of lives at the known location. It is noted that the memory location where the number of lives is stored may change as the game is played. To account for this the location of the number of lives may be tracked during a testing phase to determine the confidence with which the memory location is known.

In other implementations, the trophy assignment module 218 may perform filename recognition 734 monitor filenames that are read off a disk or other storage device as the game is emulated by the application server 106 or a client device 112. Semi-automated tools may be used to analyze the reading of filenames. As a particular non-limiting example, the trophy assignment module 218 may trigger or validate trophy assignment on reading of an ending credits file indicating completion of a game.

In some implementations, as an additional validation check, the trophy assignment module 218 may award a trophy that is based on receiving a sequence of other trophies, by comparing a list trophies won by the user to a predetermined sequence of trophies, as indicated at 736. This type of validation check can also be used to avoid improperly awarding the same trophy twice to the same user.

In some implementations, the trophy assignment module 218 may perform additional validity checks by monitoring accessing of the media content, as indicated at 738. Access to media content may be achieved, e.g., by using a title to accesses specific sectors on the disk media as the user progresses in a game, for example, at the start or end of a level, or when the player discovers something in the game, succeeds or fails to complete a level, or finishes the game, or other mechanism to identify a particular part or point in a game. The particular point is accessed by identifying the memory location on an electronic storage medium, or registry or server location or other electronic storage, or computer-readable medium.

As a non-limiting example of monitoring media access at 738, disk access in-game can be tracked to provide additional validity checks. As the game requests to read a particular sector from the disk, that read can trigger a trophy event. In addition there may be more complex events triggered via the disk sector mechanism. For example, if a game has three different endings, a trophy may be awarded after the player completes and watches all the three endings. The definition of a trophy trigger can be programmed such that a more "valuable" or sought after trophy has an increased or heighted criteria, or trigger, before the trophy will be awarded. Similarly, a low trigger threshold can be established for a less "valuable" or less sought after trophy. For example, playing a game for a predetermined amount of time may be a trophy trigger for a trophy that indicates the user logged a certain number of hours playing a game, regardless of the success of the player at the game.

Semi-automated tools may be used to analyze the contents of the disk media as well as in-game disk patterns to produce a palette of potential trophy triggers that an analyst or game producer can use to define the set of trophies for the title.

For example, using data analysis, the contents of the disk may be scanned, and specific file formats, such as video file formats, are identified and made viewable in a tool, so that an analyst may view the videos and select potential trophy triggers. For example, movies are one file used for triggers, and in this case, the movies could be extracted offline, and an analyst can allocate trophies to be unlocked when the triggers are accessed. In addition, the file name on the disk may be used to determine corresponding files, such as which level in the game.

By tracking in-game disk reading patterns, an analyst or programmer or game developer can actuate a button, or marker at the point in the game that they would like to create a trophy event trigger. By analyzing the disk reading pattern for unique sectors accessed around the time of the event, a potential trophy trigger can be further validated.

Using program counter analysis in conjunction either alone or in conjunction with performing one or more of the additional validity checks 714, the desired number and level of one or more triggers can be determined. Although aspects of the present disclosure allow trophies to be awarded for games previously released without trophy triggers, games previously released without trophy triggers may be modified to include such triggers. Furthermore, the quantity of triggers can be changed, either increased or decreased either by modifying the game or by modifying the trophy module 104.

Line 309 shows that in step 312 a determination is made whether all the established that are required for a particular trophy, or level of success triggers are detected. If all the triggers for the particular trophy or level of success or acknowledgement have been detected, "yes" line 311 leads to step 314, in which the trophies would be assigned to the player. If not, "no" line 313 leads back to step 310 to detect other triggers.

When the trophies are awarded to a player, and/or as points are accumulated by a player, the trophy/trophies earned and the accumulated points or earnings of the player are tracked. A database updated that stores data indicating earned trophies and accumulated points, so that a trophy is awarded the appropriate times to a player. For example, some trophies are awarded only once to a player, in other instances, the player can request additional awards of the same trophy. Additionally the database may contain partially earned trophies in the case where earning a trophy requires a sequence of triggers or multiple gaming sessions. This database may be a remote storage or data base such as, for example, GPMS database, or a local database, or a database accessed in a cloud computing or distributed computing environment.

After assigning the trophies or accumulating portions or progress toward a trophy, as shown in step 314, line 315 leads to an end step 316.

Figure 5:
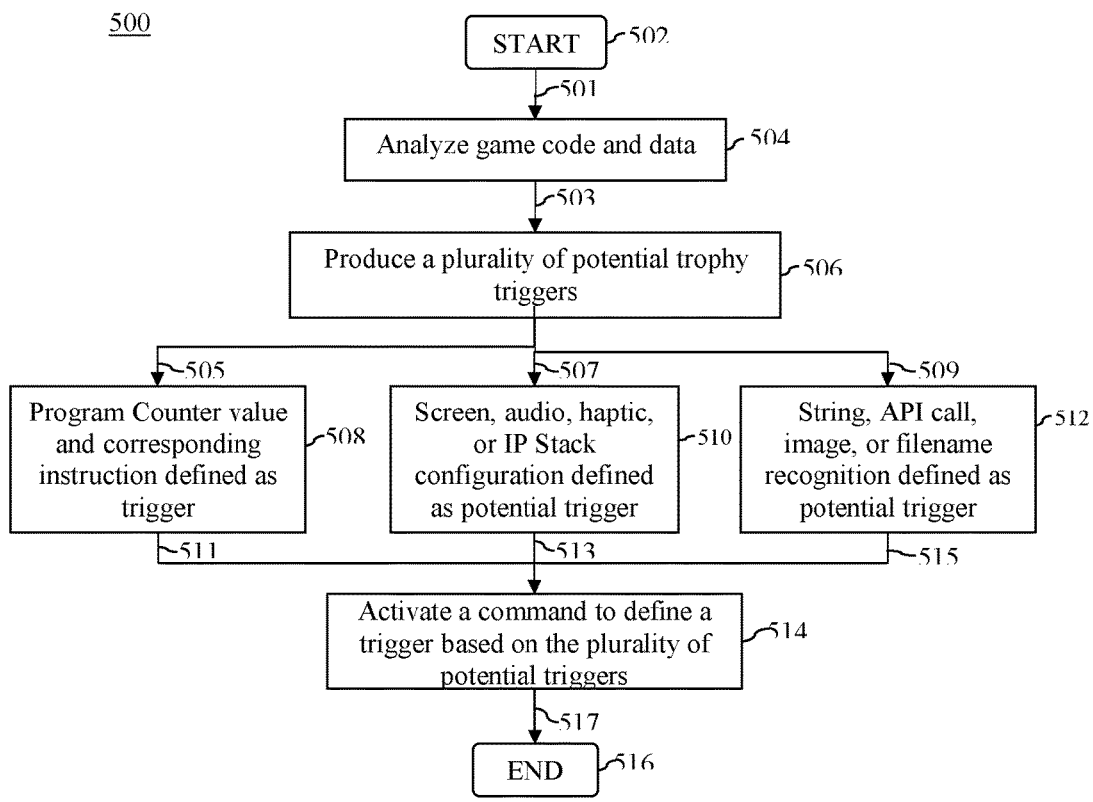
FIG. 5 shows a series of steps of defining a trophy trigger according to an aspect of the present disclosure.

FIG. 5 shows a series of steps 500 of defining a trophy trigger according to an aspect of the present disclosure. The series of steps 500 may be stored on an electronic storage medium, such as a non-transitory computer readable medium or media (e.g., RAM, ROM, EEPRPOM, DRAM or other memory, electronic storage device or registry) and may be executed by a processor or plurality of processors. The steps 500 may be computer code or other program code (e.g., source code) that may be compiled into object code. The code, stored on a medium and/or accessed, is a module, or facility or unit. Also, the memory storing the code and an associated processor is also a module or facility or unit.

FIG. 5 shows that program code 500 begins with step 502. Line 501 shows that in step 504 game code and game data is analyzed.

Line 503 shows that in step 506 a plurality of potential trophy triggers are produced. Such trophy triggers may include any of the triggering mechanisms described above with respect to FIG. 7, including the additional validity checks 715.

Based on the produced triggers, line 505 leads to step 508 in which a program counter and corresponding instruction value is defined as a potential trigger, and line 511 leads to step 514. Line 507 leads to step 510 in which a particular screen, audio, haptic, or IP Stack configuration is defined as an additional validity check for a potential trophy trigger, and line 513 leads to step 514. Line 509 leads to step 512 in which recognition of a particular string, API call, or frame image is defined as an additional validity check for a potential trophy trigger, and line 515 leads to step 514. In alternative implementations accessing a particular sector on the disk, accessing a plurality of sectors in a particular sequence, accessing a plurality of sectors in an order based on a previous triggered disk access may be defined as potential triggers for trophies.

In step 514 a command is actuated to define a trigger based on the plurality of potential triggers. This step may also include "awarding" the trigger to a player by providing (transmitting, assigning etc.) the trophy to the player's account. Line 517 leads to an end step 516.

Figure 6:
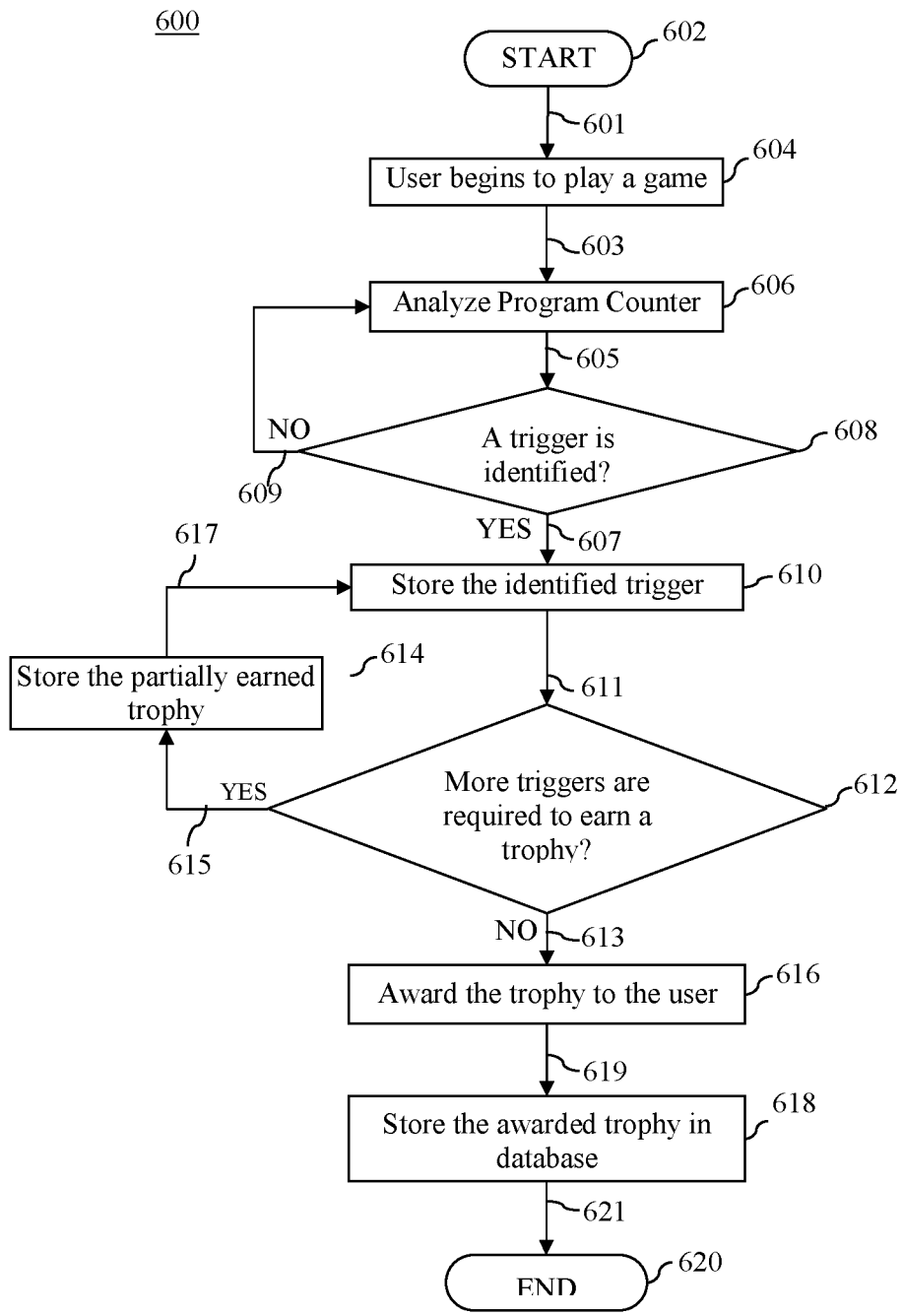
FIG. 6 shows another example of a series of steps of adding trophies to an existing game according to an aspect of the present disclosure.

FIG. 6 shows another example of a series of steps 600 of assigning trophies to an existing game according to an embodiment of the present invention. The series of steps 600 may be stored on an electronic, storage medium, such as a non-transitory computer readable medium or media (e.g., RAM, ROM, EEPRPOM, DRAM or other memory, electronic storage device or registry) and may be executed by a processor or plurality of processors. The steps 600 may be computer code or other program code (e.g., source code) that may be compiled into object code. The code, stored on a medium and/or accessed, is a module, facility or unit. Also, the code stored on a medium and accessed by a processor (either local or remote or a combination of the two) is also a module, facility or unit.

FIG. 6 shows that program code 600 begins with step 602. Line 601 shows that in step 604 a user begins to play a game or access media content or engage in an on-line activity.

Line 603 shows that in step 606 the program counter is analyzed, e.g., as described with respect to FIG. 7.

Line 605 shows that in step 608 a determination is made whether a trigger is identified. If the trigger is already identified, "yes" line 607 leads to step 610, in which the identified trigger is stored. This storage location may be a remote storage or data base such as, for example, GPMS database or a local data storage location. If not, "no" line 609 leads back to step 606 to analyze the disk reading patterns.

After storing the identified trigger in step 610, line 611 leads to step 612 in which a determination is made whether more triggers are required to earn a trophy. If more triggers, or triggering events, are required, "yes" line 615 leads to step 614 to store the partially earned trophy, and then line 617 leads back to step 608 to identify other triggers, or triggering events. If there are no more triggers, or triggering events, required, "no" line 613 leads to step 616 in which the trophy is awarded to the user. This may be done by transmitting an electronic trophy or sending a notification that a physical award, such as a T-shirt, accessory or other physical merchandise, has been earned by the player.

Line 619 shows that in step 618 the awarded trophy may be stored in an electronic database. The database may be a local database or remote storage or data base such as, for example, GPMS database.

After storing the awarded trophy, line 621 leads to an end step 620.

In aspects of the present disclosure, when there is a new application available, a trophy module software update may be used to update the process to reflect the new award, application or other amended information.

The trophy module 104 may be configured to correct for relatively rare false negative situations where a trophy that should have been validly awarded was not. For example, in some games trophies may be awarded sequentially, e.g., to get the trophy for completing level 2 you must first complete level 1. In such a case, if the trophy for completing level 1 was not awarded but all the requirements for receiving the trophy for level 2 (including successfully completing level 1) have otherwise been met, the trophy module 104 may award the user the trophy for completing level 1.

To avoid inadvertently awarding a user trophies that have already been awarded the trophy module may put information into the user's saved data that that the trophy module can use to prevent shared saved data from being used to win unearned trophies. To implement this feature the saved data should preferably be encrypted.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the aspects of the present disclosure can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular implementations disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A computer-implemented method for assigning one or more trophies to a user, comprising:
   emulating a game in response to a request from a client device;
   detecting a trophy trigger during emulation of the game by comparing a current program counter value to a predetermined program counter value and comparing a stored instruction in an instruction storage location to a predetermined instruction value when the current program counter value matches the predetermined program counter value;
   performing one or more additional checks for validity before assigning the one or more trophies, wherein performing the one or more additional checks includes checking for recognition of a particular string within a frame image, API call, or frame image; and
   assigning the one or more trophies to a user account that is associated with the user when the current program counter value matches the predetermined program counter value and the instruction in the instruction storage location matches the predetermined instruction value.

2. The method of claim 1, wherein performing the one or more additional checks includes checking for a particular screen, audio, haptic, or IP Stack configuration.

3. The method claim 1, wherein performing the one or more additional checks includes comparing an image corresponding to a current frame displayed by the game to a predetermined image.

4. The method of claim 3, wherein comparing the image corresponding to the current frame displayed by the game to the predetermined image includes comparing a hash of the image corresponding to the current frame displayed by the game to a hash of the predetermined image.

5. The method claim 1, wherein performing the one or more additional checks includes checking a level ID or number of lives.

6. The method claim 1, wherein performing the one or more additional checks includes checking for recognition of a particular filename accessed by the game.

7. The method of claim 1, wherein performing the one or more additional checks includes comparing a list trophies won by the user to a predetermined sequence of trophies.

8. The method according to claim 1, wherein performing the one or more additional checks includes checking media access of a particular storage medium associated with the game.

9. The method according to claim 1, wherein performing the one or more additional checks includes checking for access of a particular sector of a disk.

10. The method according to claim 1, performing the one or more additional checks includes checking for access of a plurality of sectors of a disk in a particular sequence.

11. The method according to claim 1, wherein performing the one or more additional checks includes checking for access of a plurality of sectors in a particular sequence based on previous triggered disk access.

12. The method according to claim 11, wherein the user views the files and selects a trophy trigger among a plurality of potential trophy triggers.

13. The method according to claim 11, wherein the file names on the disk determine a corresponding file.

14. The method according to claim 1, further comprising: storing trophies that have been assigned in a database.

15. The method according to claim 14, wherein each of the one or more trophies is assigned to a single user.

16. The method according to claim 14, wherein when a sequence of triggers is required to trigger a trophy.

17. The method of claim 14, wherein partially earned trophies are stored in the database.

18. The method according to claim 1, further comprising:
   scanning the content of the disk; and
   identifying the file format, thereby making the content viewable in a tool.

19. The method according to claim 1, wherein the user defines a trigger by actuating a command at a particular time during media content access when tracking in-game disk reading patterns.

20. A system, comprising:
   a processor;
   a memory coupled to the processor containing computer executable instructions configured to implement a computer-implemented method for assigning one or more trophies to a user when executed by the processor, the method comprising:
     emulating a game in response to a request from a client device;
     detecting a trophy trigger during emulation of the game by comparing a current program counter value to a predetermined program counter value and comparing a stored instruction in an instruction storage location to a predetermined instruction value when the current program counter value matches the predetermined program counter value;
   performing one or more additional checks for validity before assigning the one or more trophies, wherein performing the one or more additional checks includes checking for recognition of a particular string within a frame image, API call, or frame image; and
   assigning the one or more trophies to a user account that is associated with the user when the current program counter value matches the predetermined program counter value and the instruction in the instruction storage location matches the predetermined instruction value.

21. A non-transitory computer readable medium having computer executable instructions embodied therein, the computer executable instructions being configured to implement a computer-implemented method for assigning one or more trophies to a user when executed, the method comprising:

emulating a game in response to a request from a client device;

detecting a trophy trigger during emulation of the game by comparing a current program counter value to a predetermined program counter value and comparing a stored instruction in an instruction storage location to a predetermined instruction value when the current program counter value matches the predetermined program counter value;

performing one or more additional checks for validity before assigning the one or more trophies, wherein performing the one or more additional checks includes checking for recognition of a particular string within a frame image, API call, or frame image; and assigning the one or more trophies to a user account that is associated with the user when the current program counter value matches the predetermined program counter value and the instruction in the instruction storage location matches the predetermined instruction value.

* * * * *